(12) United States Patent
Oda et al.

(10) Patent No.: US 6,511,008 B1
(45) Date of Patent: Jan. 28, 2003

(54) SEAT BELT RETRACTOR WITH SHAFT SUPPORTING MECHANISM

(75) Inventors: Hideyuki Oda, Tokyo (JP); Muneo Nishizawa, Tokyo (JP)

(73) Assignee: Takata Corporation, Tokyo (JP)

( * ) Notice: Subject to any disclaimer, the term of this patent is extended or adjusted under 35 U.S.C. 154(b) by 52 days.

(21) Appl. No.: 09/693,978

(22) Filed: Oct. 23, 2000

(30) Foreign Application Priority Data

Nov. 5, 1999 (JP) .......................................... 11-314722

(51) Int. Cl.[7] ............................................... B60R 22/34
(52) U.S. Cl. ................................................... 242/376.1
(58) Field of Search .......................... 242/376.1, 379.1; 280/806, 807; 297/475, 476, 477, 478

(56) References Cited

U.S. PATENT DOCUMENTS

| | | | | |
|---|---|---|---|---|
| 3,397,531 A | * | 8/1968 | DuBois | 368/324 |
| 3,950,834 A | * | 4/1976 | Pitner | 29/898.066 |
| 4,223,853 A | * | 9/1980 | Ernst | 242/376.1 |
| 4,307,852 A | * | 12/1981 | Seifert | 242/376.1 |
| 4,366,934 A | * | 1/1983 | Seifert | 242/376.1 |
| 4,387,790 A | * | 6/1983 | Yasumatsu | 188/65.3 |
| 5,314,380 A | * | 5/1994 | Yamamoto | 464/11 |
| 6,161,961 A | * | 12/2000 | Diemer | 384/127 |

FOREIGN PATENT DOCUMENTS

| | | |
|---|---|---|
| DE | 28 32 159 | 1/1980 |
| DE | 33 13 189 | 10/1984 |
| DE | 35 32 470 | 3/1986 |
| DE | 38 28 070 | 11/1989 |
| EP | 0 261 453 | 3/1988 |
| EP | 1 074 439 | 2/2001 |
| WO | 00/43245 | 7/2000 |

* cited by examiner

*Primary Examiner*—John M. Jillions
(74) *Attorney, Agent, or Firm*—Kanesaka & Takeuchi

(57) ABSTRACT

A seat belt retractor is formed of a reel for a seat belt having a rotary shaft with an end, a bearing for rotationally supporting the end of the rotary shaft, and a rotary shaft end support formed in the bearing. The end of the rotary shaft has a curved surface, and the rotary shaft end support has an opposing surface opposing the end of the rotary shaft for supporting the end of the rotary shaft. The opposing surface has a curved surface corresponding to that of the end of the rotary shaft to thereby properly support the rotary shaft without wobbling.

8 Claims, 6 Drawing Sheets

SEAT BELT RETRACTOR WITH SHAFT SUPPORTING MECHANISM

BACKGROUND OF THE INVENTION AND RELATED ART STATEMENT

The present invention relates to a seat belt retractor for withdrawing and retracting a seat belt, and more particularly, to a bearing for a reel for retracting a seat belt.

A conventional seat belt device provided in a vehicle, such as an automobile, restricts movement of a passenger when an emergency occurs, for example, when the vehicle is affected by a large deceleration caused by a crash or the like. The seat belt device prevents the passenger from moving away from the seat, thus protecting the passenger.

This seat belt device includes a seat belt retractor for allowing the seat belt to withdraw and retract. The seat belt retractor has urging means, such as a helical spring, for urging a reel for retracting the seat belt constantly in a retracting direction. The force of the urging means retracts the seat belt on the reel when the seat belt is not fastened. When a passenger fastens the seat belt, the seat belt is withdrawn against the force of the urging means. When the emergency occurs, a lock mechanism of the seat belt retractor is actuated to prevent the reel from rotating in a withdrawing direction. The seat belt is thus stopped from withdrawal. This reliably restricts the movement of the passenger when the emergency occurs, thus protecting the passenger.

In this seat belt retractor of the conventional seat belt device, the reel for retracting the seat belt has a rotary shaft. An end for receiving the force of the urging means, which acts in the belt retracting direction, is rotationally supported by a side wall of the retractor's U-shaped frame. The other end of the rotary shaft at which the lock mechanism is provided is rotationally supported by a cover of the lock mechanism. In this case, as shown in FIG. 10, an end c of a rotary shaft b, which is supported by a lock mechanism cover a, is rotationally supported at the periphery of the end c by a cylindrical bearing d formed in the cover a.

In this structure, in which the rotary shaft end c is rotationally supported by the bearing d at the outer circumference of the end c, a bearing hole e is formed in the lock mechanism cover a for supporting the rotary shaft b. A clearance is formed between the circumferential wall of the bearing hole e and the periphery of the end c of the rotary shaft b. This causes the shaft b to become radially unstable. Accordingly, in the conventional device, a cylindrical projection g projects axially from the middle of a bottom of the bearing hole e, which is formed in the cover a. Further, an annular hole h is formed in the middle of the associated surface of the rotary shaft b. The projection g is fitted in the annular hole h to allow the rotary shaft b to rotate. This supports the end c of the rotary shaft b to stabilize the shaft b in the radial direction.

However, the radial stabilization of the rotary shaft with this bearing support structure is still inefficient and insufficient. That is, the rotary shaft is radially stabilized only in a limited manner. Further, as another method for stabilizing a rotary shaft, a method in which a shaft end is urged toward a bearing of a cover with a decreased force has been employed. However, the stabilization of the rotary shaft by this method is also insufficient.

Accordingly, the present invention has been made to solve the above problem, and it is an object of the present invention to provide a seat belt retractor that stabilizes a rotary shaft in the radial direction and suppresses rotational resistance.

SUMMARY OF THE INVENTION

To achieve the above object, in the first aspect of the invention, a seat belt retractor includes at least a reel for retracting a seat belt, a rotary shaft for the reel, and a bearing for rotationally supporting an end of the rotary shaft. In the seat belt retractor, a rotary shaft end support having an opposing surface opposing the end of the rotary shaft and supporting the end of the rotary shaft is provided in the bearing, and the end of the rotary shaft is formed as a curved surface with the opposing surface of the bearing formed as a curved surface shaped identical or substantially identical to that of the end of the rotary shaft.

In a second aspect of the invention, the curved surface is a spherical surface or a conical surface.

In a third aspect of the invention, the rotary shaft end support is provided along a predetermined area extending in a circumferential direction of the end of the rotary shaft.

In a fourth aspect of the invention, the rotary shaft end support is divided into a predetermined number of sections in the circumferential direction of the end of the rotary shaft.

In a fifth aspect of the invention, the divided sections of the rotary shaft end support are arranged at equal intervals in the circumferential direction of the rotary shaft.

In the seat belt retractor according to the present invention, the rotary shaft end is rotationally supported by the bearing such that the curved end surface of the rotary shaft abuts against the curved opposing surface of the rotary shaft end support in a matched manner. The rotary shaft is thus supported by the bearing to rotate both in the radial and axial directions. Accordingly, the rotary shaft is stabilized efficiently and sufficiently at least in the radial direction.

Particularly, in the invention described in the third aspect, the rotary shaft end support is provided along a predetermined area extending in a circumferential direction of the end of the rotary shaft. This reduces the rotational resistance when the rotary shaft is rotated.

Further, in the invention described in the fifth aspect, the predetermined number of sections of the rotary shaft end support are arranged at equal intervals in the circumferential direction of the end of the rotary shaft. That is, these sections of the rotary shaft end support are located separately from one another with respect to the entire circumference of the rotary shaft end. Accordingly, the rotational resistance of the rotary shaft end support acts uniformly on the rotary shaft, thus enabling the rotary shaft to rotate smoothly. This suppresses unstable rotation of the rotary shaft.

DETAILED DESCRIPTION OF PREFERRED EMBODIMENTS

Embodiments of the present invention will now be described with reference to the attached drawings.

Figure 1:
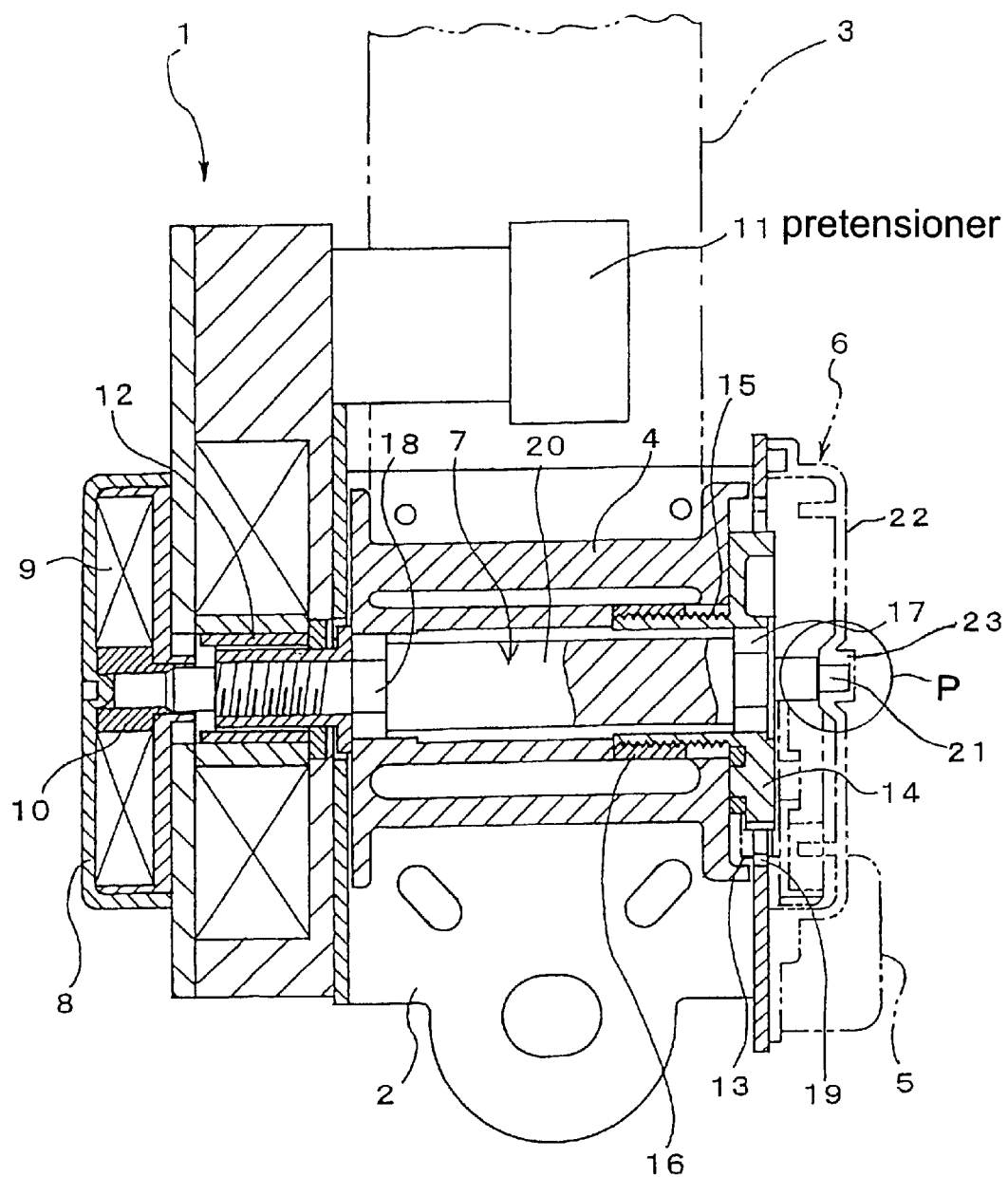
FIG. 1 is a vertical cross-sectional view schematically showing a seat belt retractor to which embodiments according to the present invention are applied.

FIG. 1 is a vertical cross-sectional view schematically showing a seat belt retractor to which the embodiments according to the present invention are applied.

As shown in FIG. 1, a seat belt retractor 1 includes a U-shaped frame 2, a seat belt 3, a reel 4, deceleration sensing means 5, a lock mechanism 6, a torsion bar 7, spring means 8, and a pretensioner 11. The reel 4 is rotationally supported by opposite side walls of the frame 2 and retracts the seat belt 3. The deceleration sensing means 5 is actuated when sensing a large deceleration of a vehicle caused by emergency. The lock mechanism 6 is actuated by the deceleration sensing means 5 to prevent the reel 4 from rotating at least in a belt withdrawing direction. The torsion bar 7 is loosely fitted in the center of the reel 4 in the axial direction. The torsion bar 7 rotationally connects the reel 4 to the lock mechanism 6. The spring means 8 urges the reel 4 constantly in a belt retracting direction through a bushing shaft 10 with the force of a spiral spring 9. The pretensioner 11 is actuated if the emergency occurs, and thus generates torque for retracting the seat belt 3.

The lock mechanism 6 rotates integrally with the reel 4 in a regular situation. The lock mechanism 6 stops when the emergency occurs, and rotates relative to the reel 4. The lock mechanism 6 has a pawl holder 14 that movably supports a pawl 13. A threaded shaft 15 is provided in the pawl holder 14. A nut-like stopper 16 is engaged with the threaded shaft 15 and rotates integrally with the reel 4. The torsion bar 7 includes a first torque transmitting portion 17 engaging the pawl holder 14 without relative rotation thereto, and a second torque transmitting portion 18 engaging the reel 4. The second torque transmitting portion 18 does not rotate relative to the reel 4.

The belt retracting torque generated by the pretensioner 11 is transmitted to the reel 4 through a bushing 12 and the torsion bar 7. This rotates the reel 4 in the belt retracting direction around the torsion bar 7 serving as a rotary shaft, thus retracting a predetermined amount of the seat belt 3.

In the seat belt retractor 1, the pretensioner 11 generates the belt retracting torque when the emergency occurs, and the torque is transmitted to the reel 4, which retracts the predetermined amount of the seat belt 3. This reliably restricts the movement of the passenger. Further, a large amount of deceleration caused by the emergency activates the deceleration sensing means 5, thus actuating the lock mechanism 6. The pawl 13 of the lock mechanism 6 thus rotates and engages an inner tooth 19 formed on a side wall of the frame 2. This stops the rotation of the pawl holder 14, and the reel 4 rotates relative to the pawl holder 14. In this state, the first and second torque transmitting portions 17, 18 of the torsion bar 7 rotate relative to each other. Accordingly, a torsion section 20 between the first and second any torque transmitting portions 17, 18 is distorted. Once the torsion section 20 is distorted, the reel 4 rotates in the belt withdrawing direction while distorting the torsion section 20 of the torsion bar 7. This restricts the load acting on the seat belt 3, thus absorbing shock acting on the passenger.

When the reel 4 rotates relative to the pawl holder 14, the stopper 16 rotates relative to the threaded shaft 15, with which the stopper 16 engages. The stopper 16 thus moves toward the pawl holder 14. When the right end of the stopper 16, as viewed in FIG. 1, abuts against the pawl holder 14, the stopper 16 is prevented from further rotating. This stops the reel 4 from rotating, thus restricting a maximum acceptable torsion of the torsion section 20 such that the torsion section 20 is not completely distorted. This prevents the torsion section 20 from being cut when the torsion section 20 is distorted.

The torsion bar 7, which is the rotary shaft of the reel 4, has an end 21 near the lock mechanism 6. The end 21 is rotationally supported by a bearing 23 provided in a cover 22 of the lock mechanism 6.

Figure 2A:
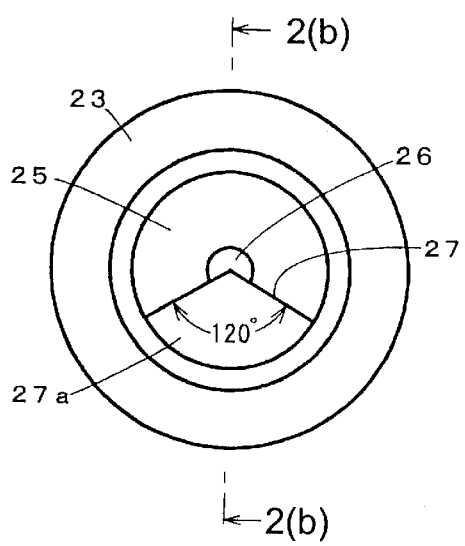
FIG. 2(a) is an enlarged side view showing a part of a bearing, corresponding to a portion P in FIG. 1, formed in a lock mechanism cover of a first embodiment of the invention.
Figure 2B:
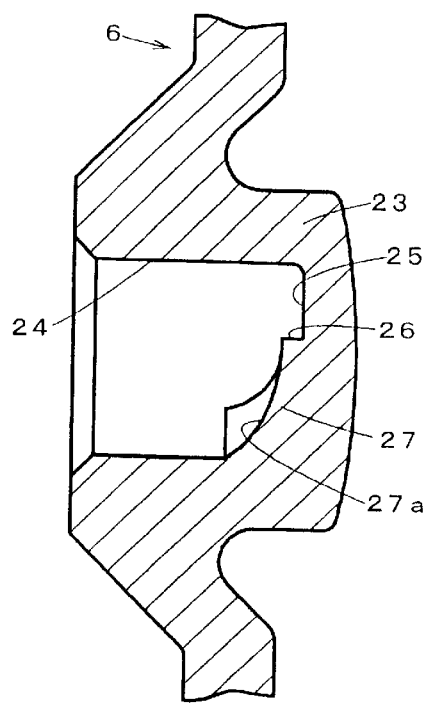
FIG. 2(b) is a cross-sectional view taken along line 2(b)—2(b) in FIG. 2(a)

FIGS. 2(a) and 2(b) show a bearing provided in a lock mechanism cover of a first embodiment according to the present invention, corresponding to a portion indicated by a circle P in FIG. 1. FIG. 2(a) is an enlarged view showing a portion of the bearing as viewed from an axial left side, and FIG. 2(b) is a cross-sectional view taken along line 2(b)—2(b) in FIG. 2(a).

As shown in FIG. 2(a) and FIG. 2(b), an axial bearing hole 24 is formed in the bearing 23 provided in the cover 22 of the lock mechanism 6, like the prior art. The end 21 of the torsion bar 7 is rotationally fitted in the bearing hole 24. A cylindrical projection 26 projects axially from the middle of a bottom 25, which corresponds to the axis of the torsion bar 7, of the bearing hole 24.

Figure 3:
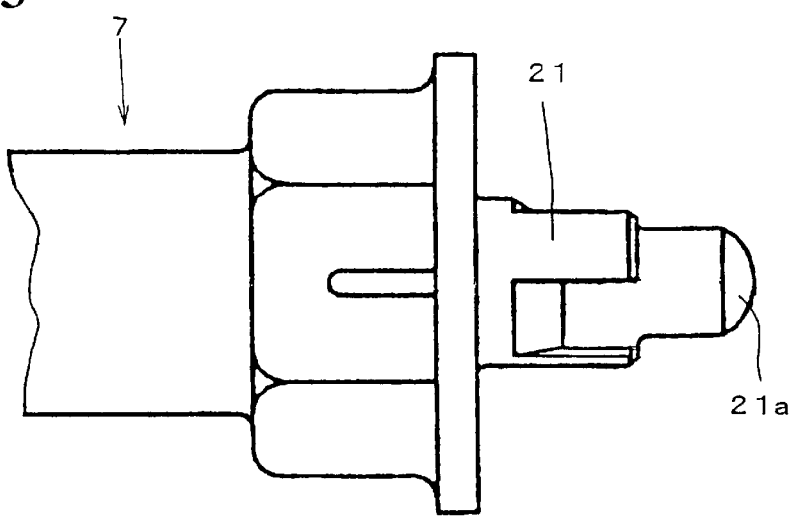
FIG. 3 is a side view showing an end of a torsion bar of the first embodiment of the present invention, corresponding to the portion P of FIG. 1.

The seat belt retractor 1 of the first example has a rotary shaft end support 27 also projecting axially from the bottom 25 of the bearing hole 24. The rotary shaft end support 27 is shaped to be arcuate and is arranged along an area corresponding to a rotational angle of 120 degrees with respect to the center of the bottom 25, as shown in FIG. 2(a). Further, as shown in FIG. 2(b), the rotary shaft end support 27 projects from a distal end of the cylindrical projection 26 toward the end 21 of the torsion bar 7. The rotary shaft end support 27 has an opposing surface 27a that opposes the associated surface of the end 21 of the torsion bar 7, which is fitted in the bearing hole 24. The opposing surface 27a is a curved surface, which is formed by a spherical surface. As shown in FIG. 3, the end 21 of the torsion bar 7 has a surface 21a formed by a spherical surface, the diameter of which is equal or substantially equal to that of the spherical, opposing surface 27a. That is, the rotary shaft end support 27 faces a predetermined circumferential area of the surface 21a of the end 21 of the torsion bar 7. The opposing surface 27a of the rotary shaft end support 27 is shaped identical or substantially identical to the spherical shape of the surface 21a of the torsion bar 7 to match the surface 21a.

In the seat belt retractor 1 of the first embodiment constructed as above, the end 21 of the torsion bar 7 is fitted in the bearing hole 24 and is thus rotationally supported by the hole 24. In this state, the spherical surface 21a of the end 21 abuts against the spherical, opposing surface 27a of the rotary shaft end support 27 in a matched manner. The end 21 is thus supported by the bearing 23 to be rotated in both radial and axial directions.

In the seat belt retractor 1 of the first embodiment is constructed as above, the spherical end surface 21a of the torsion bar 7 abuts against the spherical opposing surface 27a of the rotary shaft end support 27, which has an identical or similar shape to that of the surface 21a, in a matched manner. The surface 21a of the torsion bar 7 is thus supported at a predetermined area in both radial and axial directions. This stabilizes the torsion bar 7 in both radial and axial directions. Further, the rotary shaft end support 27 is formed not along the entire surface of the bottom 25 but only along an area corresponding to a rotational angle of 120 degrees. This decreases the rotational resistance when the torsion bar 7 is rotated. However, the rotary shaft end support 27 may be formed along the entire surface of the bottom 25 to face the entire circumferential area of the surface 21a of the end 21.

A test has been conducted using a sample of the bearing of the first embodiment, a sample of the bearing having the rotary shaft end support 27 formed along the entire surface of the bottom 25, and a sample of a conventional bearing. Table 1 shows the test results.

TABLE 1

| | Bearing Structure | Rotational Efficiency (Retracting Efficiency) | Radial Clearance |
| --- | --- | --- | --- |
| First Embodiment (Spherical Surface 33%: 120°) | | 88.2–89.1% | Almost None |
| Modification of First Embodiment (Entire Spherical Surface) | | 81.7–88.2% | Almost None |

TABLE 1-continued

| | Bearing Structure | Rotational Efficiency (Retracting Efficiency) | Radial Clearance |
| --- | --- | --- | --- |
| Conventional Example | | 88.2–90.1% | Observed |

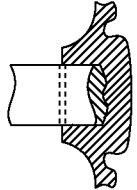

As is clear from Table 1, the bearings according to the present invention substantially stabilize the rotary shafts without wobbling, though the conventional bearing does not stabilize the rotary shaft. Further, the rotary shaft end support 27, which is provided in the bearing according to the present invention, does not substantially affect the rotational efficiency or resistance. Accordingly, the test results indicate that the rotary shaft end support 27, which has an opposing surface shape identical to the rotary shaft's end surface, stabilizes the rotary shaft efficiently and sufficiently.

As shown in Table 1, the difference between the maximum retracting efficiency of the conventional sample (90.1 percent) and the minimum retracting efficiency of the bearing sample of the first example (88.2 percent) is 1.9 percent. Further, the difference between the maximum retracting efficiency of the conventional sample (90.1 percent) and the minimum retracting efficiency of the bearing sample having the rotary shaft end support 27 formed along the entire surface of the bottom 25 (81.7 percent) is 8.4 percent. Accordingly, the rotational resistance of the first example is smaller than that of the sample having the rotary shaft end support 27 formed along the entire surface of the bottom 25. The rotational resistance of the first example is thus similar to that of the conventional sample.

Figure 4A:
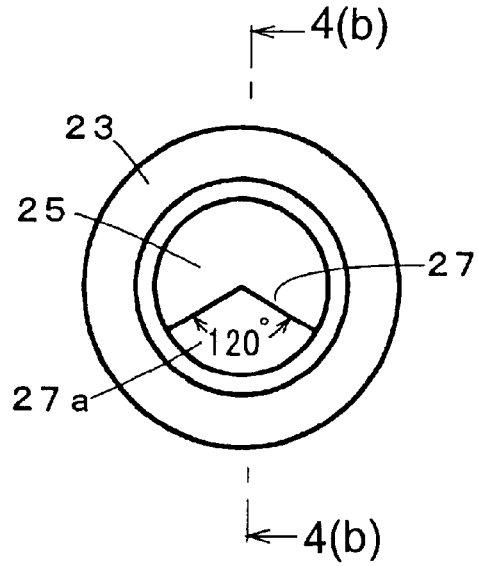
FIG. 4(a) is an enlarged side view showing a part of a bearing, corresponding to a portion P in FIG. 1, formed in a lock mechanism cover of a second embodiment of the present invention.
Figure 4B:
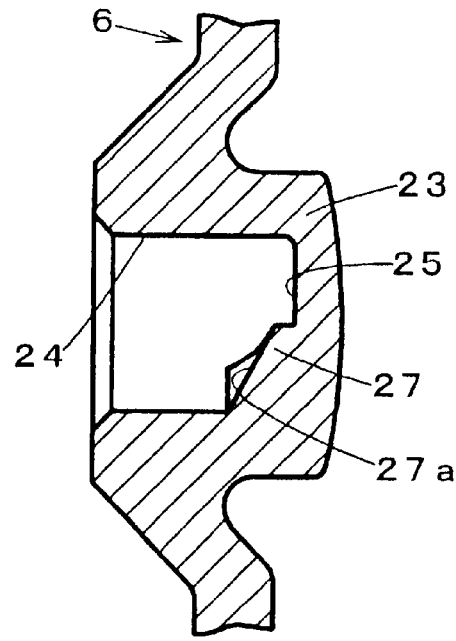
FIG. 4(b) is a cross-sectional view taken along line 4(b)—4(b) in FIG. 4(a)

FIG. 4(a) and FIG. 4(b) show a second embodiment according to the present invention, and correspond to FIG. 2(a) and FIG. 2(b), respectively.

In the first example, the opposing surface 27a of the rotary shaft end support 27 is a curved surface formed by a spherical surface. However, in the seat belt retractor 1 of the second example, the opposing surface 27a of the rotary shaft end support 27 is a curved surface formed by a conical surface. In the same manner, the surface 21a of the end 21 of the torsion bar 7 is formed as a conical surface that is identical or similar to the opposing surface 27a. The second embodiment is not provided with the cylindrical projection 26, which is provided in the first embodiment.

The remaining structure of the seat belt retractor 1 of the second embodiment is identical to that of the first embodiment. Further, the operation and advantages of the second embodiment are substantially the same as those of the first embodiment.

Figure 5A:
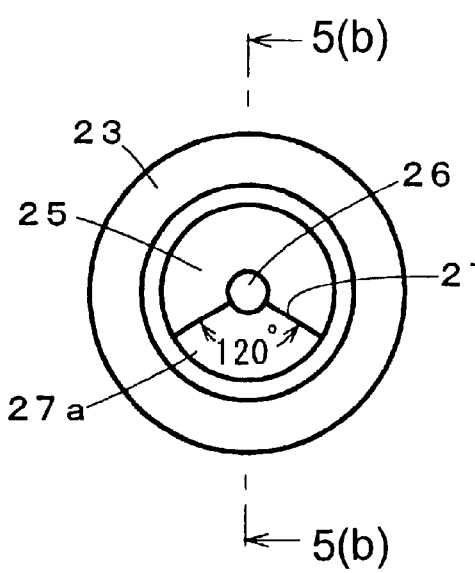
FIG. 5(a) is an enlarged side view showing a part of a bearing, corresponding to a portion P in FIG. 1, formed in a lock mechanism cover of a third embodiment of the present invention.
Figure 5B:
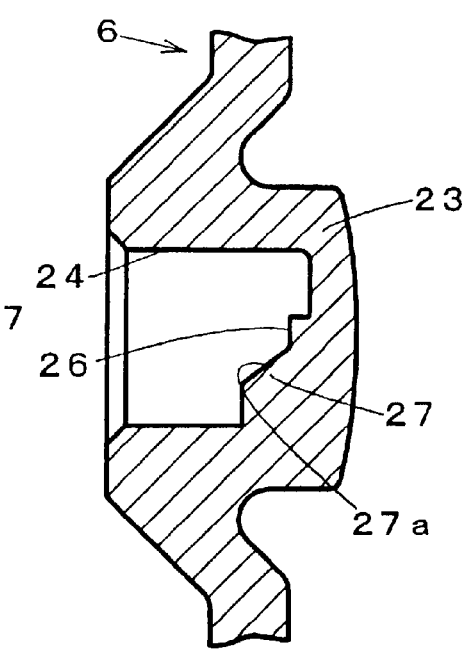
FIG. 5(b) is a cross-sectional view taken along line 5(b)—5(b) in FIG. 5(a)

FIG. 5(a) and FIG. 5(b) show a third embodiment of the present invention, and correspond to FIG. 2(a) and FIG. 2(b), respectively.

In the first embodiment, the opposing surface 27a of the rotary shaft end support 27 is a spherical surface. However, in the seat belt retractor 1 of the third embodiment, the opposing surface 27a of the rotary shaft end support 27 is a conical surface, like the second embodiment. Further, the surface 21a of the end 21 of the torsion bar 7 is formed as a conical surface that is identical or similar to the opposing surface 27a.

The remaining structure of the seat belt retractor 1 of the third embodiment is identical to that of the first embodiment. Further, the operation and advantages of the third embodiment are substantially the same as those of the first embodiment.

Figure 6A:
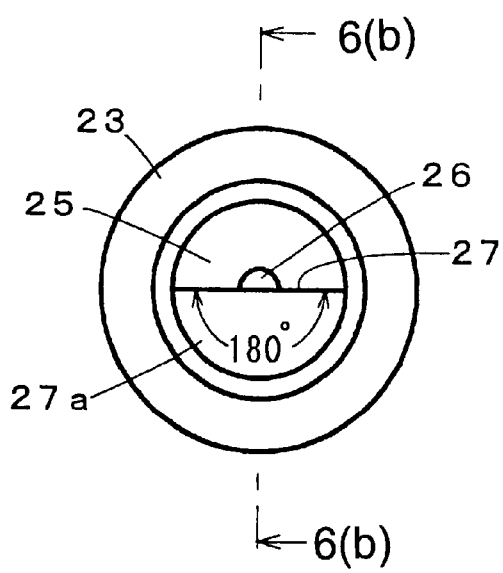
FIG. 6(a) is an enlarged side view showing a part of a bearing, corresponding to a portion P in FIG. 1, formed in a lock mechanism cover of a fourth embodiment of the present invention.
Figure 6B:
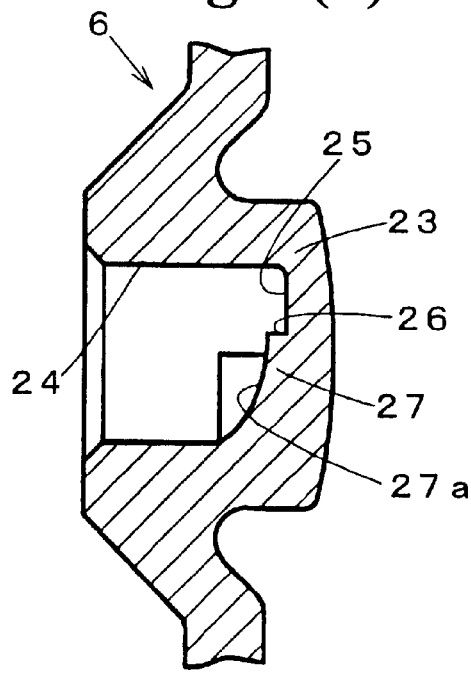
FIG. 6(b) is a cross-sectional view taken along line 6(b)—6(b) in FIG. 6(a)

FIG. 6(a) and FIG. 6(b) show a fourth embodiment according to the present invention, and correspond to FIG. 2(a) and FIG. 2(b), respectively.

In the first embodiment, the rotary shaft end support 27 is formed in an area corresponding to a rotational angle of 120 degrees. However, in the seat belt retractor 1 of the fourth embodiment, the rotary shaft end support 27 is formed in an area corresponding to a rotational angle of 180 degrees, as shown in FIG. 6(a) and FIG. 6(b).

The remaining structure of the seat belt retractor 1 of the fourth embodiment is identical to that of the first embodiment. Further, the operation and advantages of the fourth embodiment are substantially the same as those of the first embodiment, except that the rotational resistance of the fourth embodiment is slightly larger than that of the first embodiment.

Figure 7A:
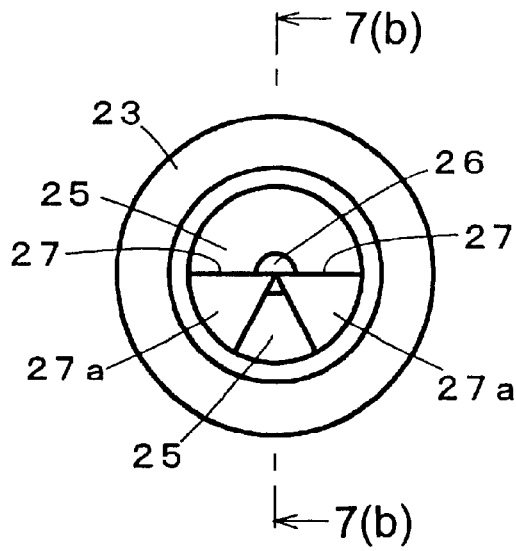
FIG. 7(a) is an enlarged side view showing a part of a bearing, corresponding to a portion P in FIG. 1, formed in a lock mechanism cover of a fifth embodiment of the present invention.
Figure 7B:
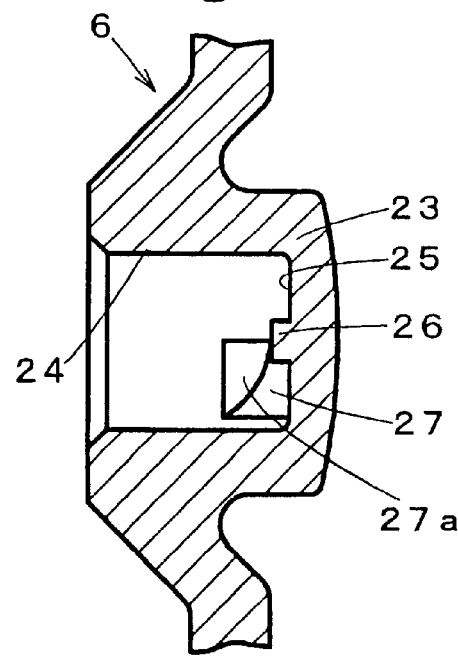
FIG. 7(b) is a cross-sectional view taken along line 7(b)—7(b) in FIG. 7(a)

FIG. 7(a) and FIG. 7(b) show a fifth embodiment according to the present invention, and correspond to FIG. 6(a) and FIG. 6(b), respectively.

In the fourth embodiment, a single rotary shaft end support 27 is formed in an area corresponding to a rotational angle of 180 degrees. However, in the seat belt retractor 1 of the fifth embodiment, the rotary shaft end support 27 is divided into two sections by removing an intermediate portion of the rotary shaft end support 27 of the fourth example, as shown in FIG. 7(a) and FIG. 7(b).

The remaining structure of the seat belt retractor 1 of the fifth embodiment is identical to that of the fourth embodiment. Further, the operation and advantages of the fifth embodiment are substantially the same as those of the fourth embodiment, except that the rotational resistance of the fifth embodiment is slightly smaller than that of the fourth embodiment.

Figure 8A:
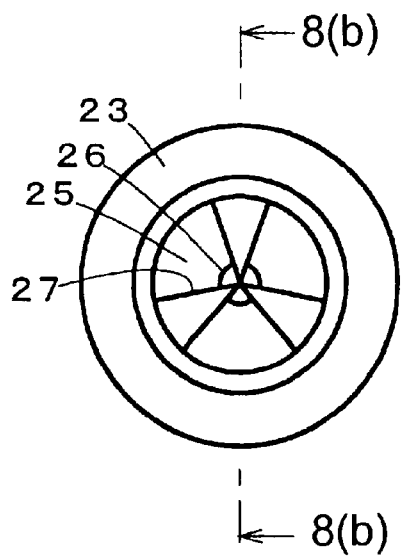
FIG. 8(a) is an enlarged side view showing a part of a bearing, corresponding to a portion P in FIG. 1, formed in a lock mechanism cover of a sixth embodiment of the present invention.
Figure 8B:
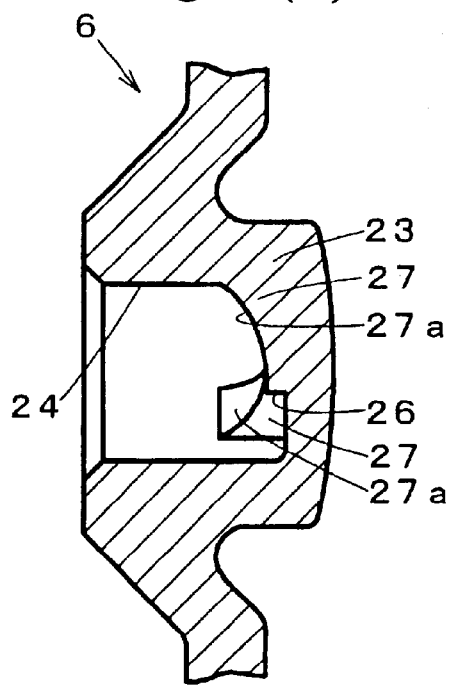
FIG. 8(b) is a cross-sectional view taken along line 8(b)—8(b) in FIG. 8(a)

FIG. 8(a) and FIG. 8(b) show a sixth embodiment according to the present invention, and correspond to FIG. 7(a) and FIG. 7(b), respectively.

In the fifth embodiment, the two sections of the rotary shaft end support 27 are arranged in an area corresponding to a rotational angle of 180 degrees. However, in the seat belt retractor 1 of the sixth embodiment, the rotary shaft end support 27 is divided into three sections that are arranged at equal intervals in a circumferential direction of the bottom 25, or in a circumferential direction of the surface 21a of the torsion bar 7, as shown in FIG. 8(a) and FIG. 8(b).

As described, in the seat belt retractor 1 of the sixth embodiment, the three sections of the rotary shaft end support 27 are arranged at equal intervals in a circumferential direction of the surface 21a of the torsion bar 7 and are located separately from one each other with respect to the entire circumference of the surface 21a. The rotational resistance of each section of the rotary shaft end support 27 thus uniformly acts on the torsion bar 7. This enables the torsion bar 7 to rotate smoothly, thus suppressing unstable rotation of the torsion bar 7.

The remaining structure and other operation and advantages of the seat belt retractor 1 of the sixth embodiment are identical to or the same as those of the fifth embodiment.

Figure 9A:
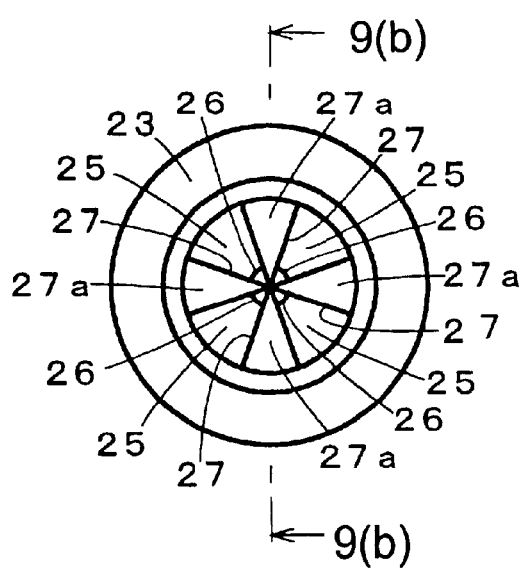
FIG. 9(a) is an enlarged side view showing a part of a bearing, corresponding to a portion P in FIG. 1, formed in a lock mechanism cover of a seventh embodiment of the present invention.
Figure 9B:
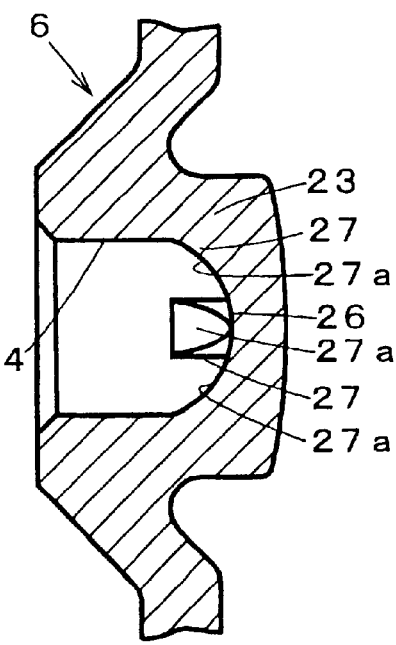
FIG. 9(b) is a cross-sectional view taken along line 9(b)—9(b) in FIG. 9(a)
Figure 10:
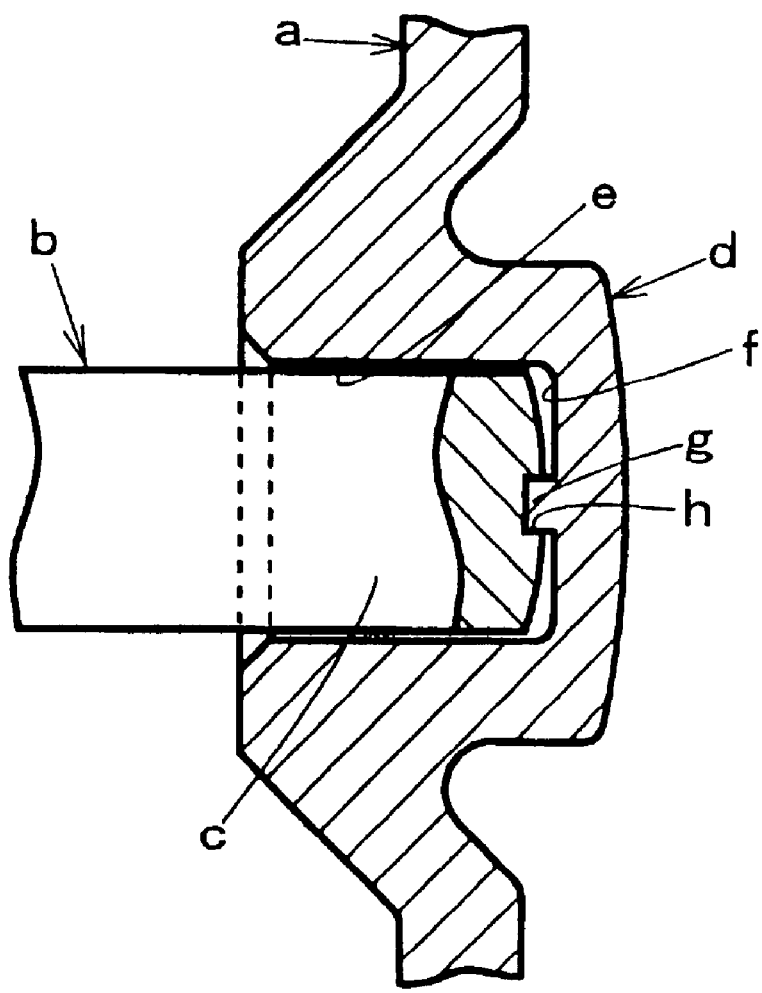
FIG. 10 is a view showing a part of a bearing for a reel rotary shaft of a conventional seat belt retractor.

FIG. 9(a) and FIG. 9(b) show a seventh embodiment according to the present invention, and correspond to FIG. 8(a) and FIG. 8(b), respectively.

In the sixth embodiment, the three sections of the rotary shaft end support 27 are arranged at equal intervals in a circumferential direction of the bottom 25. However, in the seat belt retractor 1 of the seventh embodiment, the rotary shaft end support 27 is divided into four sections that are arranged at equal intervals in a circumferential direction of the bottom 25, as shown in FIGS. 9(a) and 9(b).

The remaining structure of the seat belt retractor 1 of the seventh embodiment is identical to that of the sixth embodiment. Further, the operation and advantages of the seventh embodiment are substantially the same as those of the sixth embodiment.

The rotary shaft end support 27 may be formed along the entire surface of the bottom 25. Further, the number of the divided sections and the area in which the rotary shaft end support 27 is formed are not restricted to the above description but may be altered as needed.

In addition, the present invention may be applied to a seat belt retractor that does not include the torsion bar 7.

In the above embodiments, the bearing is formed in a cover. However, the bearing may be formed at a portion other than the cover.

As is clear from the above description, in the seat belt retractor according to the present invention, the rotary shaft end is rotationally supported by the bearing such that the curved end surface of the rotary shaft abuts against the curved opposing surface of the rotary shaft end support in a matched manner. The rotary shaft is thus supported by the bearing to rotate in the radial direction. Accordingly, the rotary shaft is stabilized at least in the radial direction efficiently and sufficiently.

Particularly, in one aspect of the invention, the rotary shaft end support is provided along a predetermined area extending in a circumferential direction of the end of the rotary shaft. This reduces the rotational resistance when the rotary shaft is rotated.

Further, in another aspect of the invention, the predetermined number of sections of the rotary shaft end support is arranged at equal intervals in the circumferential direction of the end of the rotary shaft. That is, these sections of the rotary shaft end support are located separately from one another with respect to the entire circumference of the rotary shaft end. Accordingly, the rotational resistance of the rotary shaft end support acts uniformly on the rotary shaft, thus enabling the rotary shaft to rotate smoothly. This suppresses unstable rotation of the rotary shaft.

While the invention has been explained with reference to the specific embodiments of the invention, the explanation is illustrative and the invention is limited only by the appended claims.

What is claimed is:

1. A seat belt retractor comprising:
a reel for a seat belt having a rotary shaft with a cylindrical peripheral surface and an end, said end having a spherical surface projecting axially outwardly from an edge of the cylindrical peripheral surface of the shaft to have a lower facing portion facing downwardly at the spherical surface,
a bearing rotationally supporting the end of the rotary shaft, and
a rotary shaft end support formed in the bearing and having an opposing surface opposing the end of the rotary shaft for rotationally supporting the end of the rotary shaft directly, said opposing surface having a spherical support surface corresponding to at least a part of the spherical surface of the end of the rotary shaft and formed at at least a lower part thereof, said spherical support surface axially extending toward the shaft to be located under the lower facing portion of the end of the rotary, shaft to at least partly support the lower facing portion thereat.

2. A seat belt retractor according to claim 1, wherein said rotary shaft end support is provided along a predetermined area extending in a circumferential direction of the end of the rotary shaft.

3. A seat belt retractor according to claim 2, wherein said rotary shaft end support is divided into a predetermined number of sections spaced apart from each other in the circumferential direction of the end of the rotary shaft.

4. A seat belt retractor according to claim 3, wherein said divided sections of the rotary shaft end support are arranged at equal intervals in the circumferential direction of the rotary shaft.

5. A seat belt retractor according to claim 1, wherein said opposing surface is substantially identical to that of the end of the rotary shaft.

6. A seat belt retractor according to claim 1, wherein said rotary shaft end support includes at least one projecting section having s aid spherical support surface, said projecting section extending radially outwardly from a center of the rotary shaft end support.

7. A seat belt retractor according to claim 1, wherein said rotary shaft projects outwardly at a center area thereof.

8. A seat belt retractor comprising:

a reel for a seat belt having a rotary shaft with an end, said end having a curved surface, a bearing rotationally supporting the end of the rotary shaft, and a rotary shaft end support formed in the bearing and having an opposing surface opposing the end of the rotary shaft for rotationally supporting the end of the rotary shaft, said opposing surface having a curved surface corresponding to that of the end of the rotary shaft, said rotary shaft end support being provided along a predetermined area extending in a circumferential direction of the end of the rotary shaft and divided into a predetermined number of sections spaced apart from each other in the circumferential direction of the end of the rotary shaft.

* * * * *